US007386661B2

(12) United States Patent  
Perozo et al.

(10) Patent No.: US 7,386,661 B2
(45) Date of Patent: Jun. 10, 2008

(54) POWER SAVE MODULE FOR STORAGE CONTROLLERS

(75) Inventors: Angel G. Perozo, Mission Viejo, CA (US); Theodore C. White, Rancho Santa Margarita, CA (US); William W. Dennin, Mission Viejo, CA (US); Aurelio J. Cruz, Aliso Viejo, CA (US)

(73) Assignee: Marvell International Ltd., Hamilton (BM)

( * ) Notice: Subject to any disclaimer, the term of this patent is extended or adjusted under 35 U.S.C. 154(b) by 449 days.

(21) Appl. No.: 10/965,468

(22) Filed: Oct. 13, 2004

(65) Prior Publication Data

US 2006/0080563 A1    Apr. 13, 2006

(51) Int. Cl.
G06F 12/00    (2006.01)
(52) U.S. Cl. .................................. 711/112; 713/300
(58) Field of Classification Search ............... None
See application file for complete search history.

(56) References Cited

U.S. PATENT DOCUMENTS

| 3,800,281 A | 3/1974 | Devore et al. |
| 3,988,716 A | 10/1976 | Fletcher et al. |
| 4,001,883 A | 1/1977 | Strout et al. |
| 4,016,368 A | 4/1977 | Apple, Jr. |
| 4,050,097 A | 9/1977 | Miu et al. |
| 4,080,649 A | 3/1978 | Calle et al. |
| 4,156,867 A | 5/1979 | Bench et al. |
| 4,225,960 A | 9/1980 | Masters |
| 4,275,457 A | 6/1981 | Leighou et al. |
| 4,390,969 A | 6/1983 | Hayes |
| 4,451,898 A | 5/1984 | Palermo et al. |
| 4,486,750 A | 12/1984 | Aoki |
| 4,500,926 A | 2/1985 | Yoshimaru et al. |
| 4,587,609 A | 5/1986 | Boudreau et al. |
| 4,603,382 A | 7/1986 | Cole et al. |
| 4,625,321 A | 11/1986 | Pechar et al. |
| 4,667,286 A | 5/1987 | Young et al. |

(Continued)

FOREIGN PATENT DOCUMENTS

EP    0528273    2/1993

(Continued)

OTHER PUBLICATIONS

PCT International Search Report, Doc. No. PCT/US00/15084, Dated Nov. 15, 2000, 2 Pages.

(Continued)

Primary Examiner—Reginald Bragdon
Assistant Examiner—Ngoc Dinh

(57) ABSTRACT

A method and system using a storage controller for transferring data between a storage device and a host system is provided. The storage controller includes, a power save module that is enabled in a power save mode after a receive logic in the storage controller has processed all frames and during the power save mode at least a clock is turned off to save power while a clock for operating the receive logic is kept on to process any unsolicited frames that may be received by the receive logic. The storage controller operates in a single frame mode during the power save mode to process any unsolicited frames. Setting a bit in a configuration register for a processor enables the power save mode. The power save mode is enabled after a memory controller is in a self-refresh mode.

52 Claims, 5 Drawing Sheets

U.S. PATENT DOCUMENTS

| | | |
|---|---|---|
| 4,777,635 A | 10/1988 | Glover |
| 4,805,046 A | 2/1989 | Kuroki et al. |
| 4,807,116 A | 2/1989 | Katzman et al. |
| 4,807,253 A | 2/1989 | Hagenauer et al. |
| 4,809,091 A | 2/1989 | Miyazawa et al. |
| 4,811,282 A | 3/1989 | Masina |
| 4,812,769 A | 3/1989 | Agoston |
| 4,860,333 A | 8/1989 | Bitzinger et al. |
| 4,866,606 A | 9/1989 | Kopetz |
| 4,881,232 A | 11/1989 | Sako et al. |
| 4,920,535 A | 4/1990 | Watanabe et al. |
| 4,949,342 A | 8/1990 | Shimbo et al. |
| 4,970,418 A | 11/1990 | Masterson |
| 4,972,417 A | 11/1990 | Sako et al. |
| 4,975,915 A | 12/1990 | Sako et al. |
| 4,989,190 A | 1/1991 | Kuroe et al. |
| 5,014,186 A | 5/1991 | Chisholm |
| 5,023,612 A | 6/1991 | Liu |
| 5,027,357 A | 6/1991 | Yu et al. |
| 5,050,013 A | 9/1991 | Holsinger |
| 5,051,998 A | 9/1991 | Murai et al. |
| 5,068,755 A | 11/1991 | Hamilton et al. |
| 5,068,857 A | 11/1991 | Yoshida |
| 5,072,420 A | 12/1991 | Conley et al. |
| 5,088,093 A | 2/1992 | Storch et al. |
| 5,109,500 A | 4/1992 | Iseki et al. |
| 5,117,442 A | 5/1992 | Hall |
| 5,127,098 A | 6/1992 | Rosenthal et al. |
| 5,133,062 A | 7/1992 | Joshi et al. |
| 5,136,592 A | 8/1992 | Weng |
| 5,146,585 A | 9/1992 | Smith, III |
| 5,157,669 A | 10/1992 | Yu et al. |
| 5,162,954 A | 11/1992 | Miller et al. |
| 5,193,197 A | 3/1993 | Thacker |
| 5,204,859 A | 4/1993 | Paesler et al. |
| 5,218,564 A | 6/1993 | Haines et al. |
| 5,220,569 A | 6/1993 | Hartness |
| 5,237,593 A | 8/1993 | Fisher et al. |
| 5,243,471 A | 9/1993 | Shinn |
| 5,249,271 A | 9/1993 | Hopkinson et al. |
| 5,257,143 A | 10/1993 | Zangenehpour |
| 5,261,081 A | 11/1993 | White et al. |
| 5,271,018 A | 12/1993 | Chan |
| 5,274,509 A | 12/1993 | Buch |
| 5,276,564 A | 1/1994 | Hessing et al. |
| 5,276,662 A | 1/1994 | Shaver, Jr. et al. |
| 5,276,807 A | 1/1994 | Kodama et al. |
| 5,280,488 A | 1/1994 | Glover et al. |
| 5,285,327 A | 2/1994 | Hetzler |
| 5,285,451 A | 2/1994 | Henson et al. |
| 5,301,333 A | 4/1994 | Lee |
| 5,307,216 A | 4/1994 | Cook et al. |
| 5,315,708 A | 5/1994 | Eidler et al. |
| 5,339,443 A | 8/1994 | Lockwood |
| 5,361,266 A | 11/1994 | Kodama et al. |
| 5,361,267 A | 11/1994 | Godiwala et al. |
| 5,408,644 A | 4/1995 | Schneider et al. |
| 5,420,984 A | 5/1995 | Good et al. |
| 5,428,627 A | 6/1995 | Gupta |
| 5,440,751 A | 8/1995 | Santeler et al. |
| 5,465,343 A | 11/1995 | Henson et al. |
| 5,487,170 A | 1/1996 | Bass et al. |
| 5,488,688 A | 1/1996 | Gonzales et al. |
| 5,491,701 A | 2/1996 | Zook |
| 5,500,848 A | 3/1996 | Best et al. |
| 5,506,989 A | 4/1996 | Boldt et al. |
| 5,507,005 A | 4/1996 | Kojima et al. |
| 5,519,837 A | 5/1996 | Tran |
| 5,523,903 A | 6/1996 | Hetzler et al. |
| 5,544,180 A | 8/1996 | Gupta |
| 5,544,346 A | 8/1996 | Amini |
| 5,546,545 A | 8/1996 | Rich |
| 5,546,548 A | 8/1996 | Chen et al. |
| 5,563,896 A | 10/1996 | Nakaguchi |
| 5,572,148 A | 11/1996 | Lytle et al. |
| 5,574,867 A | 11/1996 | Khaira |
| 5,581,715 A | 12/1996 | Verinsky et al. |
| 5,583,999 A | 12/1996 | Sato et al. |
| 5,592,404 A | 1/1997 | Zook |
| 5,600,662 A | 2/1997 | Zook |
| 5,602,857 A | 2/1997 | Zook et al. |
| 5,615,190 A | 3/1997 | Best et al. |
| 5,623,672 A | 4/1997 | Popat |
| 5,626,949 A | 5/1997 | Blauer et al. |
| 5,627,695 A | 5/1997 | Prins et al. |
| 5,640,602 A | 6/1997 | Takase |
| 5,649,230 A | 7/1997 | Lentz |
| 5,664,121 A | 9/1997 | Cerauskis |
| 5,689,656 A | 11/1997 | Baden et al. |
| 5,691,994 A | 11/1997 | Acosta et al. |
| 5,692,135 A | 11/1997 | Alvarez, II et al. |
| 5,692,165 A | 11/1997 | Jeddeloh et al. |
| 5,719,516 A | 2/1998 | Sharpe-Geisler |
| 5,729,718 A | 3/1998 | Au |
| 5,740,466 A | 4/1998 | Geldman et al. |
| 5,745,793 A | 4/1998 | Atsatt et al. |
| 5,754,759 A | 5/1998 | Clarke et al. |
| 5,758,188 A | 5/1998 | Applebaum et al. |
| 5,784,569 A | 7/1998 | Miller et al. |
| 5,794,073 A | 8/1998 | Ramakrishnan et al. |
| 5,801,998 A | 9/1998 | Choi |
| 5,818,886 A | 10/1998 | Castle |
| 5,822,142 A | 10/1998 | Hicken |
| 5,831,922 A | 11/1998 | Choi |
| 5,835,930 A | 11/1998 | Dobbek |
| 5,841,722 A | 11/1998 | Willenz |
| 5,844,844 A | 12/1998 | Bauer et al. |
| 5,850,422 A | 12/1998 | Chen |
| 5,854,918 A | 12/1998 | Baxter |
| 5,890,207 A | 3/1999 | Sne et al. |
| 5,890,210 A | 3/1999 | Ishii et al. |
| 5,907,717 A | 5/1999 | Ellis |
| 5,912,906 A | 6/1999 | Wu et al. |
| 5,925,135 A | 7/1999 | Trieu et al. |
| 5,937,435 A | 8/1999 | Dobbek et al. |
| 5,950,223 A | 9/1999 | Chiang et al. |
| 5,968,180 A | 10/1999 | Baco |
| 5,983,293 A | 11/1999 | Murakami |
| 5,991,911 A | 11/1999 | Zook |
| 6,029,226 A | 2/2000 | Ellis et al. |
| 6,029,250 A | 2/2000 | Keeth |
| 6,041,417 A | 3/2000 | Hammond et al. |
| 6,065,053 A | 5/2000 | Nouri et al. |
| 6,067,206 A | 5/2000 | Hull et al. |
| 6,070,200 A | 5/2000 | Gates et al. |
| 6,078,447 A | 6/2000 | Sim |
| 6,081,849 A | 6/2000 | Born et al. |
| 6,092,231 A | 7/2000 | Sze |
| 6,094,320 A | 7/2000 | Ahn |
| 6,124,994 A | 9/2000 | Malone, Sr. |
| 6,134,063 A | 10/2000 | Weston-Lewis et al. |
| 6,157,984 A | 12/2000 | Fisher et al. |
| 6,178,486 B1 | 1/2001 | Gill et al. |
| 6,192,499 B1 | 2/2001 | Yang |
| 6,201,655 B1 | 3/2001 | Watanabe et al. |
| 6,223,303 B1 | 4/2001 | Billings et al. |
| 6,279,089 B1 | 8/2001 | Schibilla et al. |
| 6,297,926 B1 | 10/2001 | Ahn |
| 6,330,626 B1 | 12/2001 | Dennin et al. |
| 6,381,659 B2 | 4/2002 | Proch et al. |
| 6,401,149 B1 | 6/2002 | Dennin et al. |
| 6,470,461 B1 | 10/2002 | Pinvidic et al. |
| 6,487,631 B2 | 11/2002 | Dickinson et al. |
| 6,490,635 B1 | 12/2002 | Holmes |

| | | | |
|---|---|---|---|
| 6,530,000 B1 | 3/2003 | Krantz et al. | |
| 6,574,676 B1 | 6/2003 | Megiddo | |
| 6,662,334 B1 | 12/2003 | Stenfort | |
| 6,781,911 B2 * | 8/2004 | Riesenman et al. | 365/226 |
| 6,826,650 B1 | 11/2004 | Krantz et al. | |
| 6,977,685 B1 * | 12/2005 | Acosta-Serafini et al. | 348/308 |
| 2001/0044873 A1 | 11/2001 | Wilson et al. | |
| 2003/0037225 A1 | 2/2003 | Deng et al. | |
| 2003/0118047 A1 * | 6/2003 | Collette et al. | 370/464 |
| 2006/0083134 A1 * | 4/2006 | Matsuno et al. | 369/47.29 |
| 2006/0230300 A1 * | 10/2006 | Lin | 713/320 |
| 2006/0288160 A1 * | 12/2006 | Krantz et al. | 711/113 |

FOREIGN PATENT DOCUMENTS

| | | |
|---|---|---|
| EP | 0622726 | 11/1994 |
| EP | 0718827 | 6/1996 |
| GB | 2285166 | 6/1995 |
| JP | 63-292462 | 11/1988 |
| JP | 01-315071 | 12/1989 |
| JP | 03183067 | 8/1991 |
| WO | 98/14861 | 4/1998 |

OTHER PUBLICATIONS

Blahut R. Digital Transmission of Information (Dec. 4, 1990), pp. 429-430.

Hwang, Kai and Briggs, Faye A., "Computer Architecture and Parallel Processing" pp. 156-164.

Zeidman, Bob, "Interleaving DRAMS for faster access", System Design ASIC & EDA, pp. 24-34 (Nov. 1993).

P.M. Bland et. al. Shared Storage Bus Circuitry, IBM Technical Disclosure Bulletin, vol. 25, No. 4, Sep. 1982, pp. 2223-2224.

PCT search report for PCT/US00/07780 mailed Aug. 2, 2000, 4 Pages.

PCT search report for PCT/US01/22404, mailed Jan. 29, 2003, 4 Pages.

* cited by examiner

| Offset Address | | |
|---|---|---|
| Access | High | Low |
| (R/W) | 11 | 10 |
| Bit | Name | Reset (h) |
| 15-11 | Power Save Status(R) | 0 |
| 10 | PLL Power Down | 0 |
| 9 | PLL Select | 0 |
| 8 | PLL Test | 0 |
| 7 | DI Controller Clock Off | 0 |
| 6 | Power Save Mode | 0 |
| 5 | Microcontroller B Clock Off | 0 |
| 4 | Microcontroller A Clock Off | 0 |
| 3 | Buffer Controller Clock Off | 0 |
| 2 | Request/Status BC Self Refresh | 0 |
| 1 | Disk Formatter Clock Off | 0 |
| 0 | BCC Clock Off | 0 |

202 → bits 15-11
201 → bit 6
203 → bit 3
204 → bit 2

200

POWER SAVE MODULE FOR STORAGE CONTROLLERS

BACKGROUND OF THE INVENTION

1. Field of the Invention

The present invention relates generally to storage device controllers, and more particularly, to a power saving system and methodology for storage device controllers.

2. Background

Conventional computer systems typically include several functional components. These components may include a central processing unit (CPU), main memory, input/output ("I/O") devices, and streaming storage devices (for example, tape drives) (referred to herein as "storage device").

In conventional systems, the main memory is coupled to the CPU via a system bus or a local memory bus. The main memory is used to provide the CPU access to data and/or program information that is stored in main memory at execution time. Typically, the main memory is composed of random access memory (RAM) circuits. A computer system with the CPU and main memory is often referred to as a host system.

The storage device is coupled to the host system via a controller that handles complex details of interfacing the storage devices to the host system. Communications between the host system and the controller is usually provided using one of a variety of standard I/O bus interfaces.

Typically, when data is read from a storage device, a host system sends a read command to the controller, which stores the read command into the buffer memory. Data is read from the device and stored in the buffer memory.

Buffer memory may be a Synchronous Dynamic Random access Memory ("SDRAM"), or Double Data Rate-Synchronous Dynamic Random Access Memory (referred to as "DDR").

Various clocks are used for operating various storage controller components. For example, a buffer controller clock ("BCCLK") is used for various storage controller components; a Fibre Channel clock ("FCCLK") is used for a Fibre Channel port/interface through which data enters the storage controller; and a receive channel (also referred to as "Channel 1" or "CH1") clock (designated as "RxCLK"). Other clocks may also be used for other components in a storage controller.

In conventional systems, in order to save power, some of these clocks are turned off in different parts of the storage controller. However, this solution may result in loss of data, especially, when unsolicited frames arrive from a Fibre Channel interface.

Therefore, there is a need for a system and method that can save power and also minimize loss of data.

SUMMARY OF THE INVENTION

A storage controller for transferring data between a storage device and a host system is provided. The storage controller includes, a power save module that is enabled in a power save mode after a receive logic in the storage controller has processed all frames and during the power save mode at least a clock is turned off to save power while a clock for operating the receive logic is kept on to process any unsolicited frames that may be received by the receive logic.

The storage controller operates in a single frame mode during the power save mode to process any unsolicited frames. Setting a bit in a configuration register for a processor enables the power save mode. The power save mode is enabled after a memory controller is in a self-refresh mode. The power save module monitors a bit that denotes when a memory controller is in a self-refresh mode. A clock power control module is used to turn off a buffer controller clock during the power save mode.

The power save module exits the power save mode upon receiving an unsolicited frame or a reset signal from a processor.

A system for transferring data between a storage device and a host system is provided. The system includes a storage controller with a power save module that is described above.

In yet another aspect of the present invention, a method used by a storage controller that facilitates data transfer between a host system and a storage device is provided. The method includes, enabling a power save module to start a power save sequence when a receive logic in the storage controller has processed all frames, wherein during the power save mode at least a clock is turned off to save power while a clock for operating the receive logic is kept on to process any unsolicited frames; enabling a single frame mode during which a received frame is handled by storage controller firmware; and exiting the power save mode if an unsolicited frame is received by the receive logic.

This brief summary has been provided so that the nature of the invention may be understood quickly. A more complete understanding of the invention can be obtained by reference to the following detailed description of the preferred embodiments thereof concerning the attached drawings.

BRIEF DESCRIPTION OF THE DRAWINGS

The foregoing features and other features of the present invention will now be described with reference to the drawings of a preferred embodiment. In the drawings, the same components have the same reference numerals. The illustrated embodiment is intended to illustrate, but not to limit the invention. The drawings include the following Figures.

DETAILED DESCRIPTION OF THE PREFERRED EMBODIMENTS

To facilitate an understanding of the preferred embodiment, the general architecture and operation of a controller will initially be described. The specific architecture and operation of the preferred embodiment will then be described with reference to the general architecture.

Figure 1A:
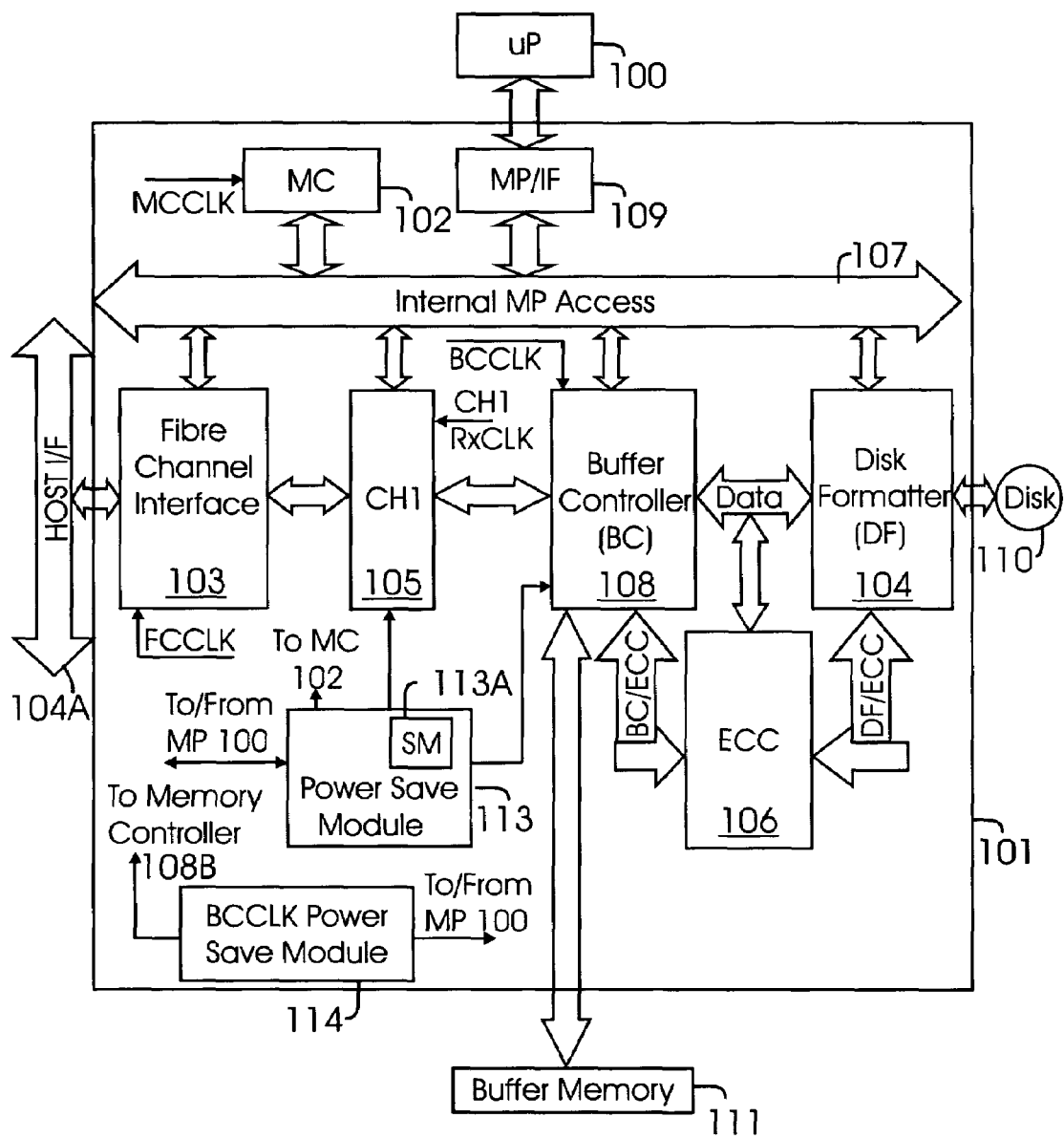
FIG. 1A is an example of a storage system having a storage controller with a power save module according to one aspect of the present invention.

The system of FIG. 1A is an example of a storage drive system (with an optical disk or tape drive), included in (or coupled to) a computer system. The host computer (not shown) and the storage device 110 (also referred to herein as disk 110) communicate via a port using a disk formatter "DF" 104. Storage device 110 may be connected to the host computer via a data bus. The data bus, for example, is a bus in accordance with a Small Computer System Interface (SCSI) specification. Those skilled in the art will appreciate that other communication buses known in the art can be used to transfer data between the drive and the host system.

As shown in FIG. 1A, the system includes controller 101, which is coupled to buffer memory 111 and microprocessor (may also be referred to as "MP") 100. Interface 109 serves to couple microprocessor bus 107 to microprocessor 100 and a micro-controller (may also be referred to as "MC") 102. MC 102 operates under a clock that is designated as MCCLK.

A read only memory ("ROM") omitted from the drawing is used to store firmware code executed by microprocessor 100. Fibre Channel interface interfaces with host interface 104A and processes Fibre Channel frames. Fibre Channel interface 103 operates under the FCCLK.

Controller 101 can be an integrated circuit (IC) that comprises of various functional modules, which provide for the writing and reading of data stored on storage device 110. Microprocessor 100 is coupled to controller 101 via interface 109 to facilitate transfer of data, address, timing and control information.

Buffer memory 111 is coupled to controller 101 via ports to facilitate transfer of data, timing and address information. Buffer memory 111 may be a DDR or SDRAM or any other type of memory. Buffer memory 111 operates under the BCCLK.

Disk formatter 104 is connected to microprocessor bus 107 and to buffer controller 108. A direct memory access ("DMA") DMA interface (not shown) is connected to microprocessor bus 107 and to data and control port (not shown).

Buffer controller (also referred to as "BC") 108 connects buffer memory 111, channel one (CH1) 105, error correction code ("ECC") module 106 and to bus 107. Buffer controller 108 regulates data movement into and out of buffer memory 111. BC 108, DF 104 and ECC module 106 operate under the BCCLK.

Data flow between a host and disk passes through buffer memory 111. ECC module 106 generates the ECC that is saved on disk 110 writes and provides correction mask to BC 108 for disk 110 read operation.

Plural channels may be used to allow data flow. Channels (for example, channel 0 ("CH0"), CH1 105 and channel 2 ("CH2") (not shown)) are granted arbitration turns when they are allowed access to buffer memory 111 in high speed burst write or read for a certain number of clocks. The plural channels use first-in-first out ("FIFO") type memories to store data that is in transit.

CH1 105 may be inside BC 108 or outside BC 108, as shown in FIG. 1A and operates under the RxCLK. Another channel (CH2) (not shown) may also be provided so that controller 101 can be used with different systems.

Figure 1B:
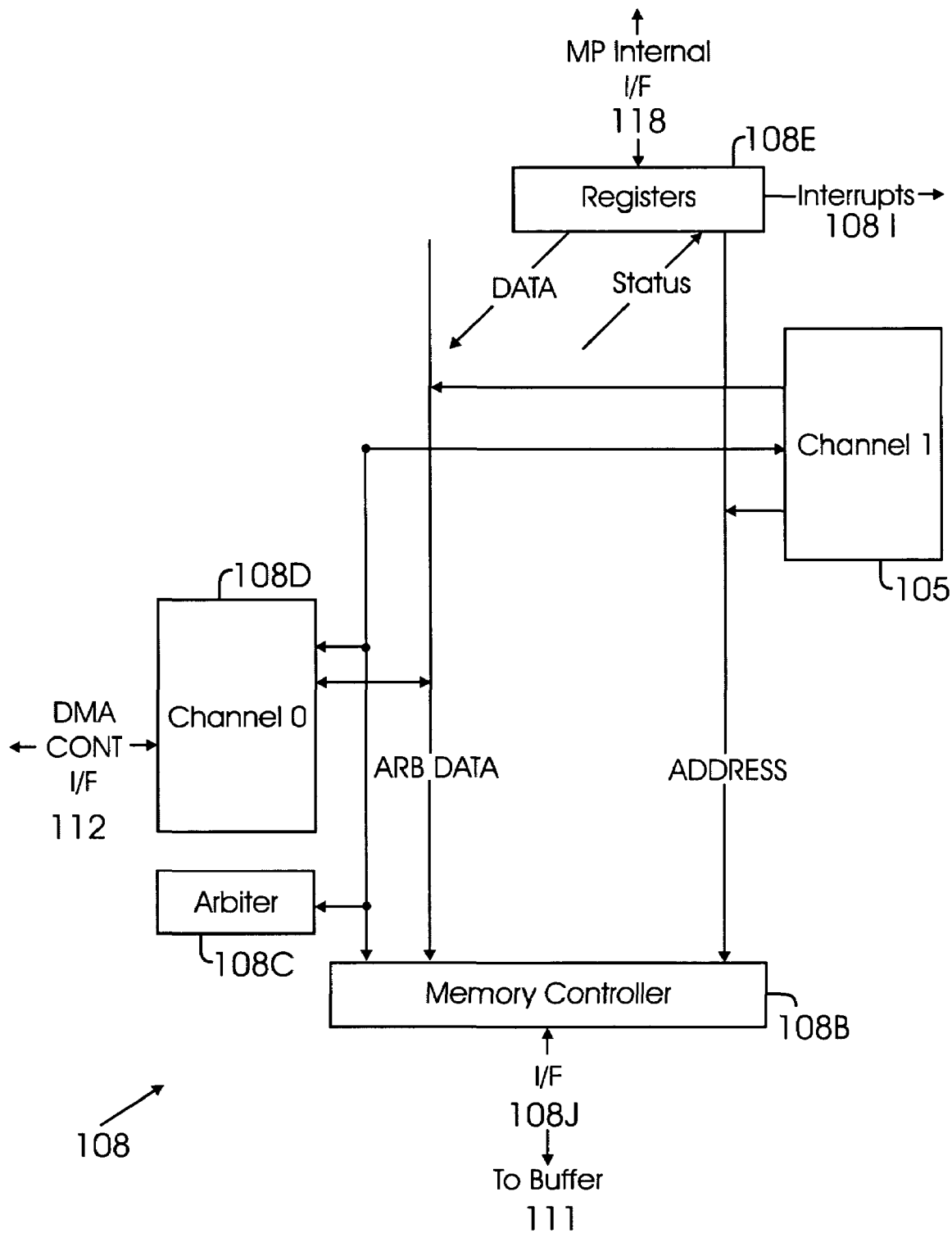
FIG. 1B is a block diagram of a buffer controller, according to one aspect of the present invention.

Buffer Controller 108:

FIG. 1B shows a block diagram of BC 108 with CH0 108D that interfaces with DF 104, via interface 112, for moving data to and from buffer 111. BC 108 includes register(s) 108E and an Arbiter 108C. Arbiter 108C arbitrates between plural channels in BC 108, for example, CH0 108D, and CH1 105 and CH2 (not shown). Register 108E is coupled to interface 109 via bus 107 (and interface 118) that allows microprocessor 100 and BC 108 to communicate.

BC 108 also includes a memory controller 108B that interfaces with buffer 111 through a SDRAM interface 108J. Interrupts 108I are sent from buffer controller 108 to processor 100.

BCCLK that is used for various components may be generated by using an oscillator (not shown) and controlled by a clock distribution module. The clock distribution module and clock generation has been described in U.S. patent application Ser. No. 10/867,113 filed on Jun. 24, 2004, the disclosure of which is incorporated herein by reference in its entirety.

As described below, power save module 113 and BCCLK Power Save module 114 (may also be referred to as BCCLK Power Save Module or BCCLK_PWR_CNTRL) are used to save power in storage controller 101, according to one aspect of the present invention.

Power Save Module 113:

In one aspect of the present invention, power save module 113 is provided that uses a clock distribution system so that the BCCLK is shut down in various modules, for example, ECC module 106, DF 104, and memory controller 108B. The receive clocks for Fibre Channel interface 103 and CH1 105 in the receive path are kept running to process unsolicited frames that may be received via interface 103.

Figure 2A:
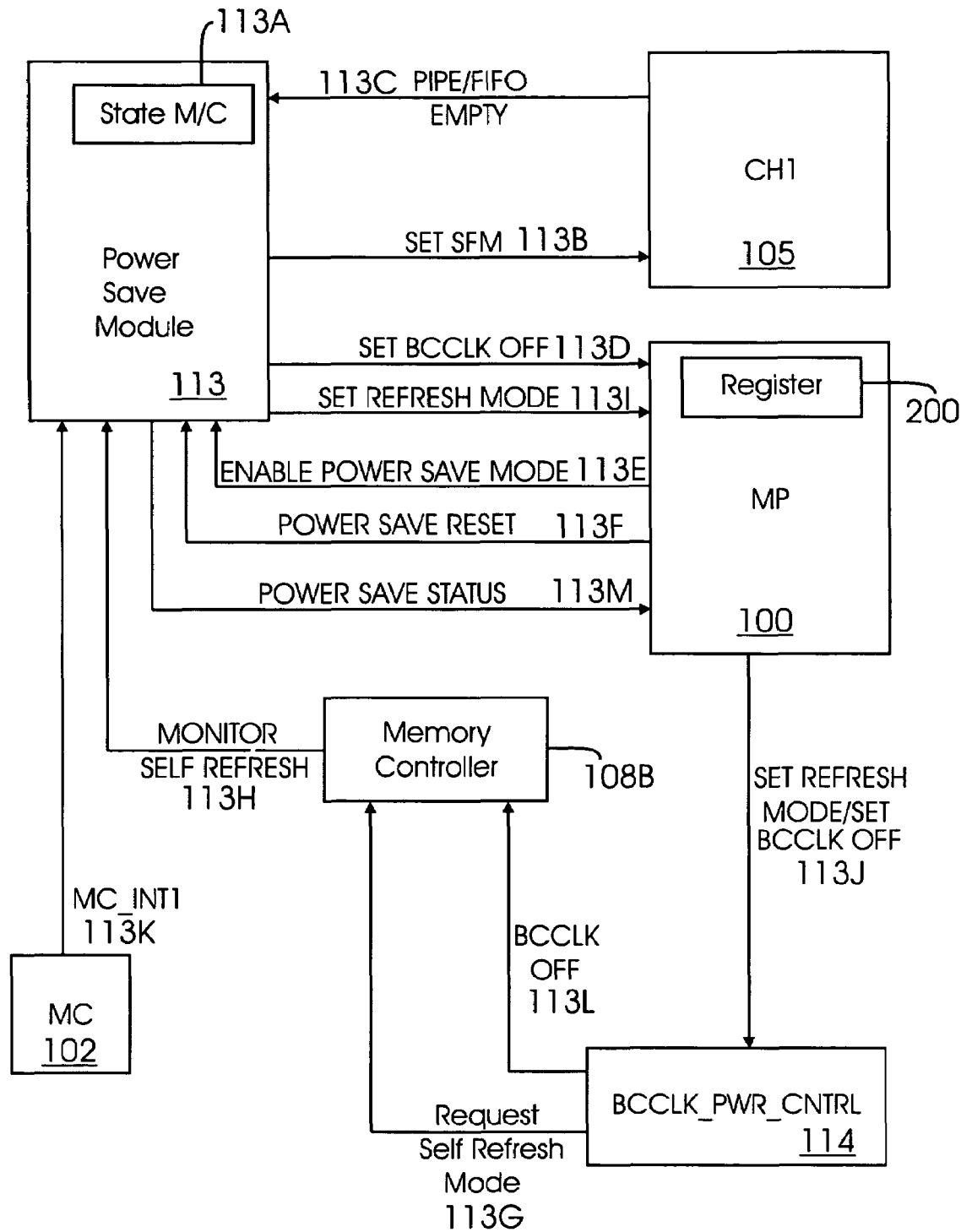
FIG. 2A is a block diagram showing a power save module interfacing plural components of a storage controller, according to one aspect of the present invention.

FIG. 2A shows a block diagram of power save module 113 as it interfaces with various components of storage controller 101. Power save module 113 includes a state machine (may also be referred to as "SM or State M/C") 113A that implements the power saving feature, according to one aspect of the present invention. The power saving feature ("Power Save Mode") is turned on by the firmware of storage controller 101. The Power Save Mode, when set drives the buffer memory 111 (via memory controller 108B) into a self-refresh mode and turns the BCCLK off.

The Power Save Mode is turned on when there are no pending interrupts in the receive logic (i.e. Fibre Channel Interface 103 and CH1 105). State machine 113A monitors CH1 105 flags and waits until all the data in CH1 105 has been processed. Thereafter, the Power Save Mode is enabled.

A single frame mode ("SFM") is also used in conjunction with the power save mode. During the SFM, unsolicited frames are not sent to BC 108 when the BCCLK is turned off, but instead frames are handled/processed/throttled (used interchangeably) individually.

Figures 2B, 2C:
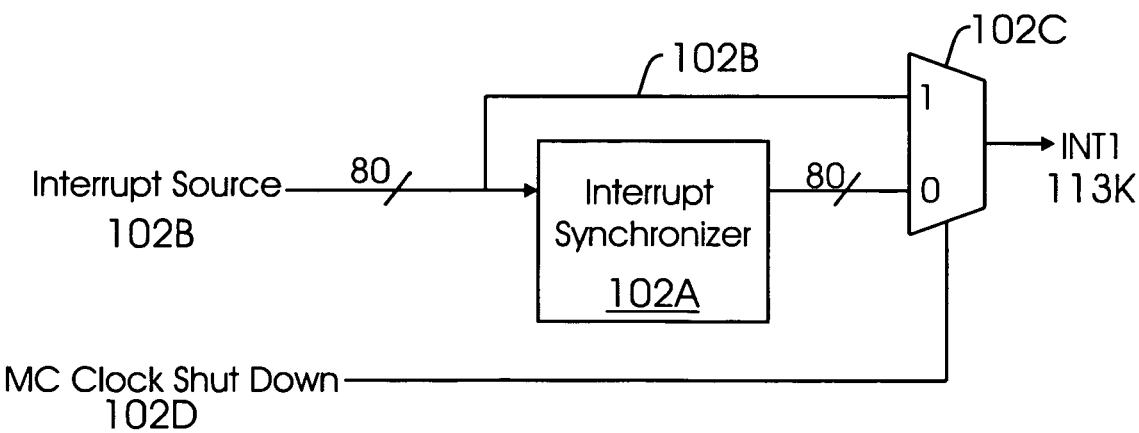
FIG. 2B shows a configuration table used according to one aspect of the present invention.
FIG. 2C shows a logic diagram that is used to generate an interrupt, according to one aspect of the present invention.

A user that wants to use controller 101 in the power save mode sets the "Power Save Mode" bit (shown as 201) in MP 100 configuration register 200 in FIG. 2B. When the Power Save mode bit 201 is set, MP 100 sends a signal/command (used interchangeably throughout this specification) 113E that instructs power save module 113 to start a power save sequence.

Upon receiving signal 113E, power save module sends signal 113B to CH1 105 logic. Signal 113B sets CH1 105 into SFM and during this mode each frame in CH1 105 is throttled (or handled) individually. Every frame that is received during the SFM uses a firmware action before being transferred to buffer memory 111. After this, power save module 113 waits until CH1 105 FIFO (not shown) and transmit pipe used for moving frames (not shown) are empty.

Signal 113C notifies power save module 113 when CH1 105 has processed all the frames. Once the FIFO and the pipes are empty, power save module 113 instructs MP 100 via signal 113I to enter into a self-refresh mode and to turn off the BCCLK (via signal 113D). In turn, MP 100 notifies BCCLK Power Control module 114, via signal 113J to enter into a self-refresh mode and to turn off the BCCLK. The self-refresh mode allows data in buffer memory 111 to stay current/valid.

BCCLK Power Control module 114 notifies memory controller 108B, via signal 113G to enter into a self refresh mode. Power save module 113 monitors signal 113H to determine if and when buffer memory 111 is in refresh mode. Once buffer memory 111 is in refresh mode, BCCLK power control module 114 sends signal 113L to memory controller 108B to turn off the BCCLK. This turns off the BCCLK for various modules, including BC 108, ECC module 106, and DF 104. The clocks for FC interface 103 and CH1 105 are always running to receive an unsolicited frame.

When an unsolicited frame is received by FC interface 103 and CH1 105, an interrupt 113K is generated. This resets the Power Save Mode and Power Save module 113 exits the power save sequence. The unsolicited frame is processed in the SFM. Thereafter, the entire process is repeated again.

FIG. 2B shows a table of various bits that are used in register 200 to perform the power save operations, according to one aspect of the present invention. As discussed above bit 201 when set instructs power save module 113 to start a power save sequence. Resetting bit 201 instructs the power save module 113 to exit the power save mode. Bit 201 is reset when an interrupt 113K is generated by MC 102.

Power save status is provided to MP 100 via signal 113M and is represented by plural bits 202, as listed below:

Bit 00001: State Machine 113A is in idle state 300 and the Power Save mode bit 201 is 0.

Bit 00010: The Power Save module 113 is waiting for CH1 105 FIFOs and pipelines to become empty.

Bit 00100: The Power Save module 113 is waiting for buffer memory 111 to go into the self-refresh mode.

Bit 01000: Buffer memory 111 is in self-refresh mode and the BCCLK is not running.

Bit 10000: An interrupt 113K occurred or MP 100 requested (via signal 113F, FIG. 2A) to exit Power Save Mode. The Power Save module 113 then turns the BCCLK on and waits for buffer memory 111 to exit the self-refresh mode.

Bit 203: This bit is used to turn off the BCCLK. The bit may be set by an external microprocessor or by the Power Save mode.

Bit 204: This bit when set (for example, 1), allows the memory controller 108B to go in the self-refresh mode. When the bit is cleared (for example, 0), the memory controller 108B exits the self-refresh mode.

FIG. 2C shows a schematic diagram used for generating interrupts 113K from MC 102. Interrupt 102B is sent to Interrupt synchronizer 102A and also to multiplexer 102C. The unsynchronized version of interrupt 102B passes through interrupt pin INT1 as 113K. This alerts MP 100 of the arrival of an unsolicited frame from Fibre Channel interface 103. Each MC clock may be shut off by signal 102D.

Figure 3:
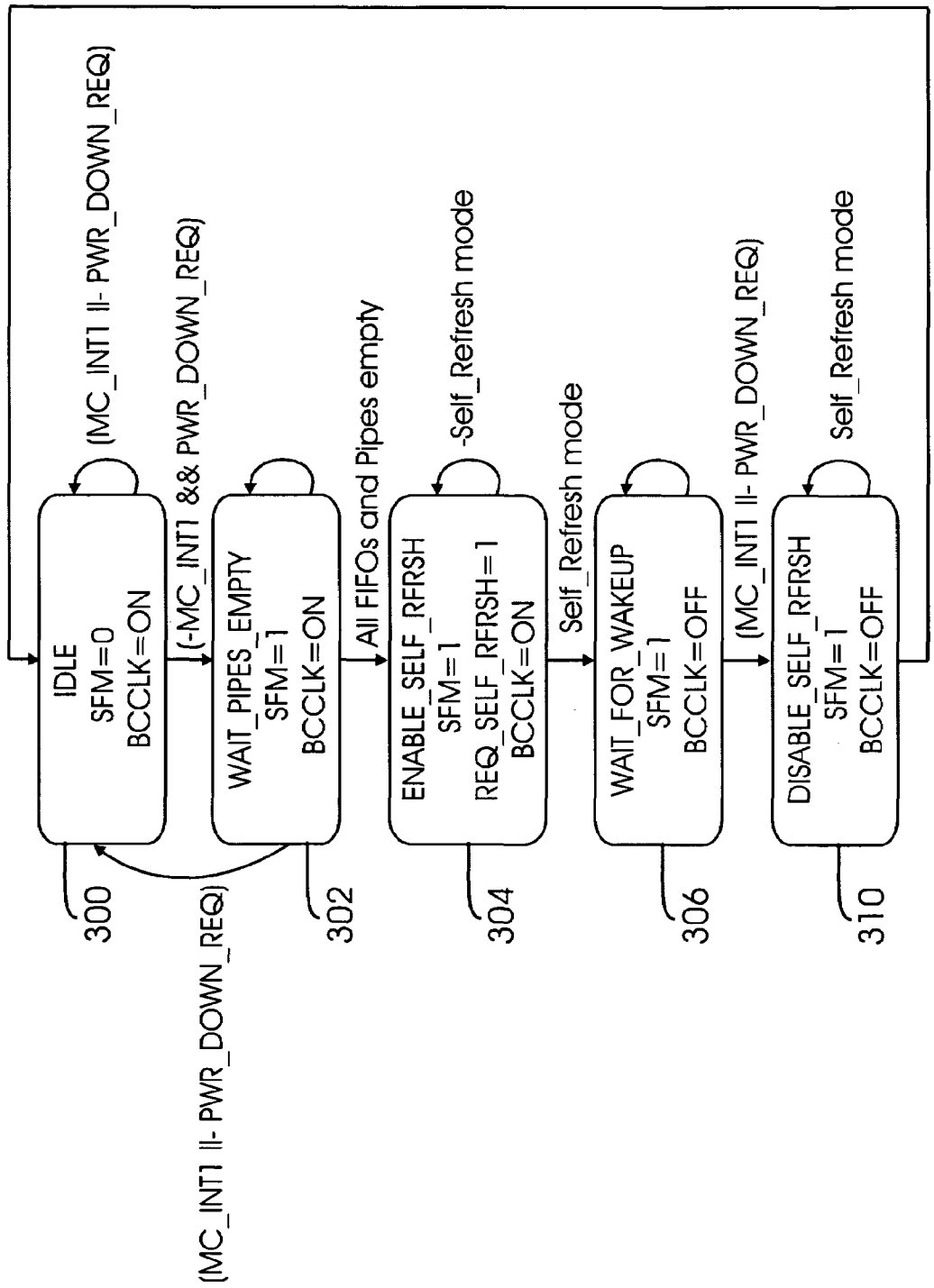
FIG. 3 is a state machine diagram, according to one aspect of the present invention.

State Machine 113A Diagram:

FIG. 3 shows a state machine diagram for operating state machine 113A to save power, according to one aspect of the present invention. State Machine 113A is at initial idle state 300. During this state, the BCCLK is on and the SFM is off. This signifies that the storage controller 101 is operating normally.

In state 302, state machine 113B waits for CH1 105 FIFO's to become empty. This occurs after the power save mode bit 201 is set. During this state, the SFM is enabled and the BCCLK is on.

In state 304, the self-refresh mode is enabled, after CH1 105 FIFO and frame-processing pipeline (not shown) is empty. During this state, the SFM is turned on, a self-refresh request is placed and the BCCLK is still on.

Once the self-refresh mode is enabled, in state 306, the BCCLK is turned off, while the SFM is still enabled. The state machine 113A now waits for a wake up event. Two events may "wakeup" state machine 113A, first an interrupt 113K from MC 102 or a reset request 113F from MF 100. Once the wake up event occurs, the self-refresh is disabled in state 310. The BCCLK is still turned off and SFM 1 is still enabled. During this state, if an unsolicited frame arrived, then the frame is processed in the SFM. After the frame is processed, the state machine is back to the idle state 300.

In one aspect of the present invention, clocks are turned off selectively to components that are idle. The components that may receive unsolicited frames have their clocks on to process incoming frames. This saves power with minimum loss of data.

Although the present invention has been described with reference to specific embodiments, these embodiments are illustrative only and not limiting. Many other applications and embodiments of the present invention will be apparent in light of this disclosure.

What is claimed is:

1. A storage controller for an optical disk drive for transferring data between the optical disk drive and a host system, comprising:

a memory controller that interfaces with a memory that stores the data;

a first receive logic interface that provides an interface between the storage controller and the host system;

a second receive logic interface that provides an interface between the storage controller and the optical disk drive; and a power save module that is enabled in a power save mode after the first and second receive logic interfaces in the storage controller have processed all frames and during the power save mode at least a clock of the memory controller is turned off to save power while a clock for operating the first and second receive logic interfaces is kept on to process any unsolicited frames that may be received by the first and second receive logic interfaces.

2. The storage controller of claim 1, wherein the power save module includes a state machine.

3. The storage controller of claim 1, wherein the power save module exits the power save mode upon receiving an unsolicited frame.

4. The storage controller of claim 1, wherein the power save mode is enabled after the memory controller is in a self-refresh mode.

5. The storage controller of claim 1, wherein the storage controller operates in a single frame mode during the power save mode to process any unsolicited frames.

6. The storage controller of claim 1, wherein the power save module exits the power save mode upon receiving a reset signal from a processor.

7. The storage controller of claim 1, wherein the power save module exits the power save mode upon receiving an interrupt from a processor.

8. The storage controller of claim , wherein the power save module monitors a bit that denotes when the memory controller is in a self-refresh mode.

9. The storage controller of claim 1, wherein the power save mode is enabled by setting a bit in a configuration register for a processor.

10. The storage controller of claim 1, wherein a clock power control module is used to turn off the clock of the memory controller during the power save mode.

11. A system for transferring data between an optical disk drive and a host system, comprising:
a memory controller that transfers the data between the optical disk drive and the host system, and that interfaces with a memory that stores the data;
a first receive logic interface that provides an interface between the memory controller and the host system;
a second receive logic interface that provides an interface between the memory controller and the optical disk drive; and
a power save module that is enabled in a power save mode after a the first and second receive logic interfaces have processed all frames and during the power save mode at least a memory controller clock is turned off to save power while a clock for operating the first and second receive logic interfaces is kept on to process any unsolicited frames that may be received by the first and second receive logic interfaces.

12. The system of claim 11, wherein the power save module includes a state machine.

13. The system of claim 11, wherein the power save module exits the power save mode upon receiving an unsolicited frame.

14. The system of claim 11, wherein the power save mode is enabled after the memory controller is in a self-refresh mode.

15. The system of claim 11, wherein the system operates in a single frame mode during the power save mode to process any unsolicited frames.

16. The system of claim 11, wherein the power save module exits the power save mode upon receiving a reset signal from a processor.

17. The system of claim 11, wherein the power save module exits the power save mode upon receiving an interrupt from a processor.

18. The system of claim 11, wherein the power save module monitors a bit that denotes when the memory controller is in a self-refresh mode.

19. The system of claim 11, wherein the power save mode is enabled by setting a bit in a configuration register for a processor.

20. The system of claim 11, wherein a clock power control module is used to turn off the memory controller clock during the power save mode.

21. A method used by a storage controller for an optical disk drive that facilitates data transfer between a host system and the optical disk drive comprising:
controlling a memory that stores the data using a memory controller; providing a first receive logic interface between the storage controller and the host system;
providing a second receive logic interface between the storage controller and the optical disk drive; and
enabling a power save module to start a power save sequence when the first and second receive logic interfaces in the storage controller have processed all frames, wherein during the power save mode at least a clock of the memory controller is turned off to save power while a clock for operating the first and second receive logic interfaces is kept on to process any unsolicited frames;
enabling a single frame mode during which a received frame is handled by storage controller firmware; and
exiting the power save mode if an unsolicited frame is received by at least one of the first and second receive logic interfaces.

22. The method of claim 21, wherein the power save module enters the power save mode after the memory controller is in a self-refresh mode.

23. The method of claim 22, wherein the power save module monitors a bit that denotes when the memory controller is in a self-refresh mode.

24. The method of claim 21, wherein the power save module exits the power save mode upon receiving a reset signal from a processor.

25. The method of claim 21, wherein the power save module exits the power save mode upon receiving an interrupt signal from a processor.

26. The method of claim 21, wherein the power save mode is enabled by setting a bit in a configuration register for a processor.

27. The method of claim 21, wherein a clock power control module is used to turn off the clock of the memory controller during the power save mode.

28. A storage controller for an optical disk drive comprising:
a memory that stores data that is transferred between a host and the optical disk drive;
a memory control module that transfers the data to and from the memory based on a first clock signal;
first and second receive interfaces that receive the data from the host and the optical disk drive, respectively, based on at least one second clock signal; and
a power save module that includes a power save mode, wherein when in the power save mode the first clock signal is turned off and the at least one second clock signal is turned on.

29. The storage controller of claim 28 further comprising at least one of a disk formatter and an error correction code (ECC) module that receives the first clock signal.

30. The storage controller of claim 28 wherein the first and second receive interfaces further comprise receive logic that processes received data frames based on the at least one second clock signal.

31. The storage controller of claim 30 wherein the receive logic includes at least one of a channel module and a fibre channel interface.

32. The storage controller of claim 30 wherein the power save module communicates with the receive logic and manages the power save mode based on the received data frames.

33. The storage controller of claim 32 wherein the power save module initiates the power save mode when there are no received data frames to process.

34. The storage controller of claim 28 wherein the memory enters a self-refresh mode during the power save mode.

35. The storage controller of claim 28 further including a single frame mode, wherein received frames are processed individually when the storage controller is in the single frame mode.

36. The storage controller of claim 28 further comprising a clock power control module that communicates with the power save module, wherein the clock power control module adjusts the first clock signal based on the power save module.

37. A storage controller for an optical disk drive, comprising:
memory means for storing data that is transferred between a host and the optical disk drive;

memory control means for transferring the data to and from the memory means based on a first clock signal; and first and second receive interface means for receiving the data from the host and the optical disk drive, respectively, based on at least one second clock signal; and power save means for including a power save mode, wherein when in the power save mode the first clock signal is turned off and the at least one second clock signal is turned on.

38. The storage controller of claim 37 further comprising at least one of disk formatting means and an error correction code (ECC) means for receiving the first clock signal.

39. The storage controller of claim 37 wherein the first and second receive interface means further comprise receive logic means for processing received data frames based on the at least one second clock signal.

40. The storage controller of claim 39 wherein the receive logic means includes at least one of a channel means and a fibre channel interface means for receiving the received data frames.

41. The storage controller of claim 39 wherein the power save means communicates with the receive logic means and manages the power save mode based on the received data frames.

42. The storage controller of claim 41 wherein the power save means initiates the power save mode when there are no received data frames to process.

43. The storage controller of claim 37 wherein the memory means enter a self-refresh mode during the power save mode.

44. The storage controller of claim 37 further including a single frame mode, wherein received frames are processed individually when the storage controller is in the single frame mode.

45. The storage controller of claim 37 further comprising clock power control means for communicating with the power save module, wherein the clock power control means adjusts the first clock signal based on the power save means.

46. A method for operating a storage controller for an optical disk drive, comprising:

storing data that is transferred between a host and the optical disk drive in a memory;

transferring the data to and from the memory based on a first clock signal; and receiving the data from the host and the optical disk drive at first and second receive logic interfaces, respectively, based on at least one second clock signal; and operating in a power save mode, wherein when in the power save mode the first clock signal is turned off and the at least one second clock signal is turned on.

47. The method of claim 46 further comprising receiving the first clock signal using at least one of a disk formatter and an error correction code (ECC) module.

48. The method of claim 46 further comprising processing received data frames based on the at least one second clock signal.

49. The method of claim 48 further comprising at least one of initiating and terminating the power save mode based on the received data frames.

50. The method of claim 49 further comprising initiating the power save mode when there are no received data frames to process.

51. The method of claim 46 wherein the memory enters a self-refresh mode during the power save mode.

52. The method of claim 46 further comprising initiating a single frame mode, wherein received frames are processed individually during the single frame mode.

* * * * *

UNITED STATES PATENT AND TRADEMARK OFFICE
CERTIFICATE OF CORRECTION

PATENT NO. : 7,386,661 B2  
APPLICATION NO. : 10/965468  
DATED : June 10, 2008  
INVENTOR(S) : Angel G. Perozo et al.

It is certified that error appears in the above-identified patent and that said Letters Patent is hereby corrected as shown below:

Column 6, Line 62   Insert -- 1 -- after "claim"

Signed and Sealed this

Seventh Day of October, 2008

JON W. DUDAS  
*Director of the United States Patent and Trademark Office*